United States Patent [19]

Rice

[11] Patent Number: 5,043,751
[45] Date of Patent: Aug. 27, 1991

[54] SELF-BRACING CREDIT-CARD-SIZE CAMERA FOR SINGLE-SHOT EMERGENCY USE, AND METHOD FOR MANUFACTURE AND DISTRIBUTION

[76] Inventor: Richard Rice, 217 So. Hampton Dr., Venice, Calif. 90291

[21] Appl. No.: 534,964

[22] Filed: Jun. 8, 1990

[51] Int. Cl.$^5$ .................... G03B 17/04; G03B 17/38
[52] U.S. Cl. .................................... 354/187; 354/266
[58] Field of Search .................. 354/187, 186, 266

[56] References Cited

U.S. PATENT DOCUMENTS

| 360,499 | 4/1887 | Whittell | 354/187 |
|---|---|---|---|
| 844,152 | 2/1907 | Little | 354/187 |
| 1,298,312 | 3/1919 | Earle | 354/187 |
| 2,789,490 | 1/1954 | Kaufman | 354/187 |
| 4,329,037 | 5/1982 | Caviness | 354/187 |
| 4,518,235 | 5/1985 | Reed et al. | 354/187 X |
| 4,660,951 | 4/1987 | Reed et al. | 354/187 |
| 4,846,553 | 7/1989 | Rice | 350/250 |

*Primary Examiner*—Jae N. Noh
*Attorney, Agent, or Firm*—Ashen Martin Seldon Lippman & Scillieri

[57] ABSTRACT

The camera body is of sheet material. When in a usage condition it has four intersecting panels, each in the form of an arched segment. The arched panels are in two pairs, each pair being mutually opposed. One opposed pair is outward-concave, and the other is outward-convex. When squeezed together, the concave panels brace and stabilize the convex panels: the body is inherently strong and stable in its usage condition. When in a storage condition the same body has just two planar, parallel panels—readily carried in a wallet, or distributed by a mail in a magazine. A light-sensitive medium is held within the body. Mounted to the body is a lens for focusing a scene onto the sensitive medium, and a positively interlocked single-shot shutter mechanism for controlling passage of light through the lens. The sheet material, preferably all one piece, is scored along circular-segmental lines. Squeezing two opposite edges together, when the body is in the storage condition, forces the material to fold along the scores, forming the four arched panels, to place the body in the usage condition. Two of the arched panels have predefined widths, to correctly space apart the other two—and thereby the lens and the light-sensitive medium—for focusing of a scene by the lens onto the sensitive medium.

14 Claims, 11 Drawing Sheets

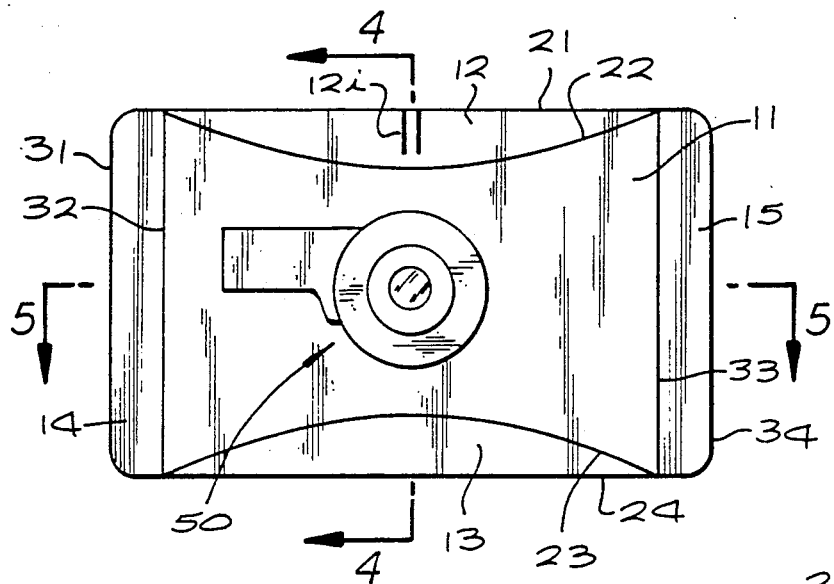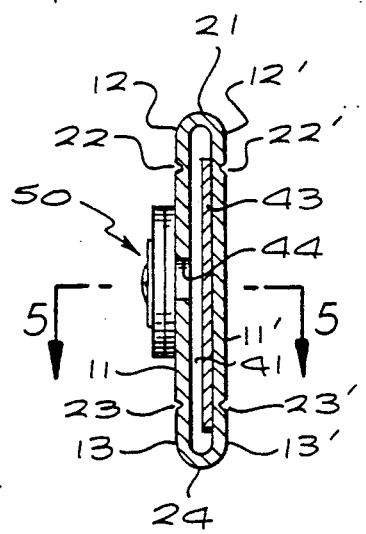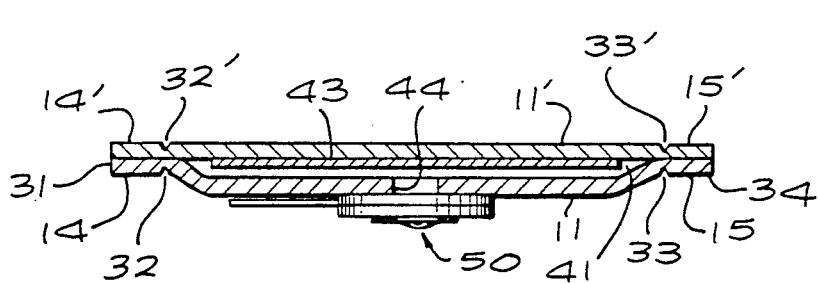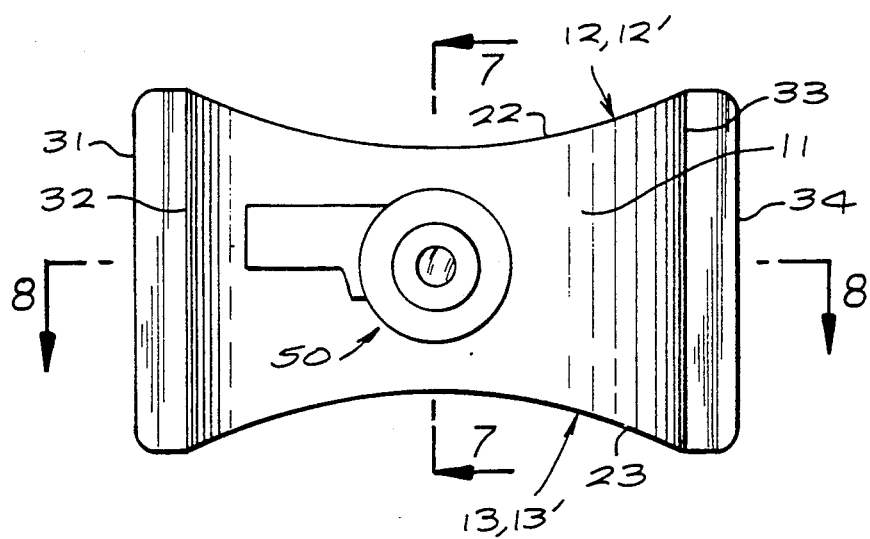

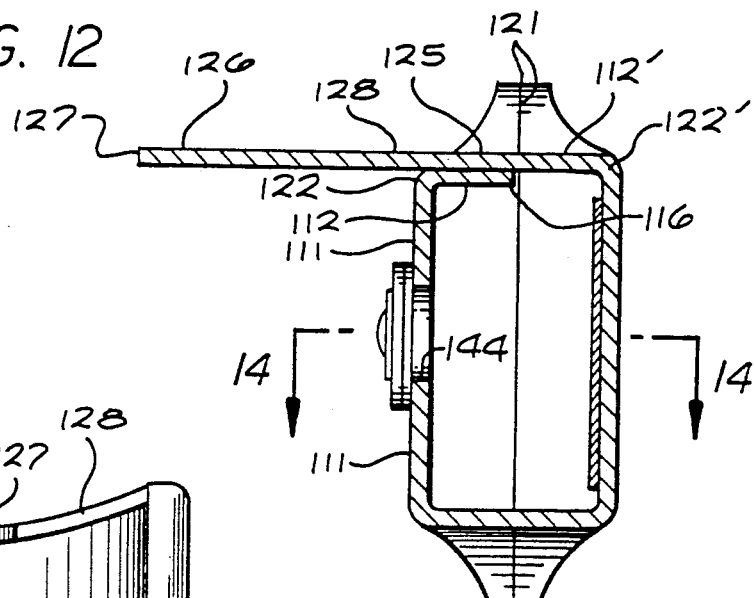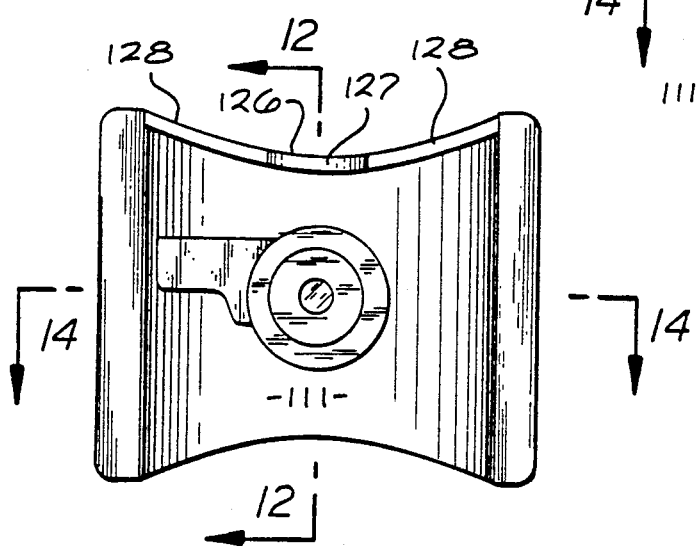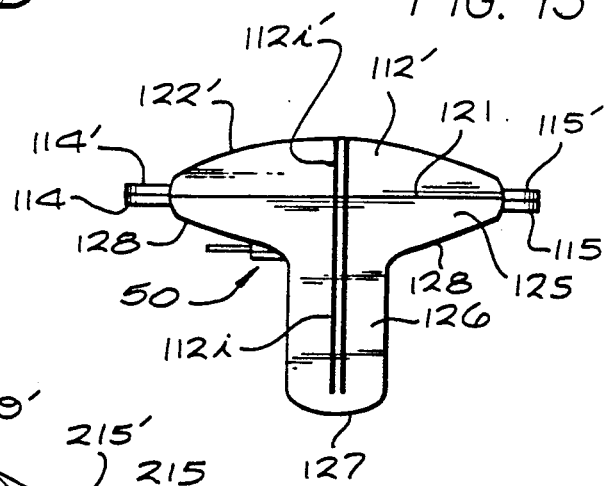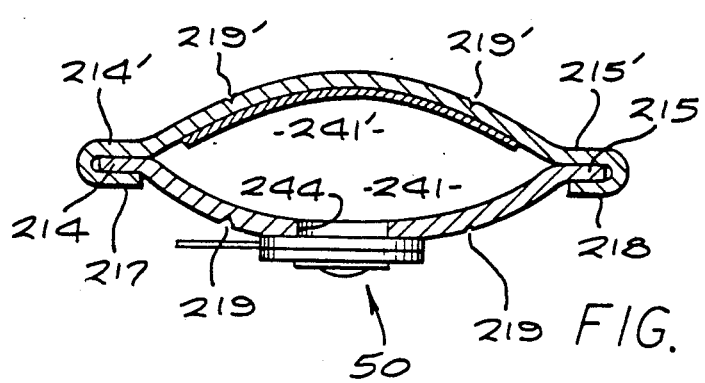

SELF-BRACING CREDIT-CARD-SIZE CAMERA FOR SINGLE-SHOT EMERGENCY USE, AND METHOD FOR MANUFACTURE AND DISTRIBUTION

BACKGROUND

1. Field of the Invention

This invention relates generally to self-bracing three-dimensional structures of sheet material for use as camera bodies. It relates more particularly to a novel, very small structure that is fitted with a positively-interlocked single-shot shutter—to form a reliable emergency camera which can be distributed through the mails in the same manner as an advertising insert, and thereafter carried in the same manner as a credit card.

2. Prior Art

Camera bodies fabricated of sheet material appear in many patents, including U.S. Pats. Nos. 4,660,951 and 4,518,235 to Reed et al.; 4,329,037 to Caviness; 1,298,321 to Earle, 844,152 to Little; and 360,499, issued in 1887 to Whittell. Foreign patents to such constructions include French patent 623,166 to Marwitz et al. (1926), German patent 196,626 to Gutmann et al. (1906), and U. K. 8,654 to Knight et al. (1886). The Little patent, though titled "Camera", actually employs that term in its now-historical sense and shows a camera of the type used for *tracing* optical images.

Most of these camera bodies are plural-stage bellows, or multilayer fold-up stuctures, either not self-bracing, or not very thin. Thus the structures introduced by Reed, Earle, Whittell, Guttmann, and Knight do not appear to be self bracing. In addition, most of them seem quite bulky when folded down, although one or more might well be carried in a shirt or jacket pocket as suggested in one of the references.

While the structures of Caviness, Little and Marwitz are triangular or trapezoidal, and consequently do seem to have some self-bracing character, they are even bulkier. This latter fact may not be immediately evident from the illustrations of those respective patents—until it is recognized that the additional thicknesses introduced by the necessarily present *side panels* add to the total thicknesses by very large fractions.

These troublesome side panels, which are deemphasized in most of the drawings, also introduce another drawback. Structures with discrete side panels are progressively more awkward or difficult to fabricate automatically and economically (i.e., with minimal waste) from a single sheet of material.

Aside from the absence of self-bracing properties and shutter interlock, the configuration of greatest interest in regard to the present invention may be that introduced in the Reed '951 patent—particularly FIGS. 6 through 8. As can be seen in Reed's FIGS. 7 and 8, his camera folds down as only a single-stage bellows; the usage condition is created by squeezing together the two opposing edges (top left and bottom right in FIG. 7) to erect the bellows.

The result is the rectangular parallelepiped shown in Reed's FIG. 6. Unfortunately, if the user continues to squeeze the two opposing edges even more tightly they will tend to collapse inward, thereby defocusing the camera. In other words, nothing inherently limits the travel of those two opposing edges to stabilize the structure in its fully erected condition.

Another drawback of the Reed cameras, also applicable to several other patents mentioned above that purport to disclose one-picture cameras, is that the shutter is readily reopened to expose the same photosensitive medium again. In fact the medium can be reexposed as many times as a person happens to open the shutter, whether inadvertently or otherwise.

Thus Earle, for example, says, "Still another object of my invention is to produce a camera that will take but the one exposure." Upon careful reading, however, one discovers that "after the camera has been opened and a pin stuck through the paper over the opening thereof, a flap of paper will come down over this opening when the camera is again closed so that no undesirable light will passs into the camera after the exposure has been made." Of course nothing prevents unfolding Earle's camera and again moving the flap of paper.

My U.S. Pat. No. 4,846,553 for a "Foldable Viewer" may be of some interest. It is in a different field of apparatuses, but does pertain to distribution methods related to those introduced in this document.

SUMMARY OF THE DISCLOSURE

Before attempting to summarize the apparatus and method that are disclosed in this document, I wish to present an informal introduction to several points of innovation upon which my invention is based. As will be seen, the apparatus and method of my invention are themselves very distinct from prior inventions: but the motivations which underlie development of my apparatus and method are also believed to be in themselves innovative and extraordinary.

Thus a part of my invention consists in recognition that a new and distinct usage or market exists for one-shot cameras that are thin enough to be carried in a wallet, as is a credit card, or mailed in magazines. This is true, however, only if the camera is actually reasonably reliable in producing usable photographs when eventually used.

The market contemplated here is for an emergency one-shot camera. Such a device can be carried unobtrusively on the person for a relatively long period of time, such as months or even years; and then used at the scene of an accident or other emergency, generally unanticipated, to record meaningful evidence of the circumstances.

I have further recognized that it is particularly advantageous if such a camera is amenable to shipment by inclusion in publications that travel by second-class mail. Not only is this an outstandingly efficient and economical means of distribution for each camera, but it produces an article that is particularly well adapted to distribution as a promotional or giveaway item.

The economics of distribution are such that many articles can be most effectively disseminated as promotional gifts. This can be as true of useful devices, such as my emergency camera, that possess distinct social value and great utility as it is of purely whimsical diversions or novelty items.

Thus for example a very thin camera can be distributed as a promotional gift by an automobile-insurance company, for use by actual or desired customers in recording the scenes of automobile accidents. Many other applications for such a camera will occur to persons skilled in the specialized arts of conceiving and developing high-volume promotional items.

Such a camera must be much thinner than those shown in any prior art that I have found. People will carry in shirt or jacket pockets—for short periods of time, when they know in advance that they will soon want to take pictures—articles which would be far too bulky to carry in a wallet for long periods of time, or to mail in a magazine. A camera structure that can be carried unobtrusively in a wallet, for many months or even years before use, is very strongly preferred to satisfy the requirement that it actually be available in event of an emergency.

Once again, however, reliability of the camera as a true photographic device is essential to its usefulness, or the promotion will backfire by producing negative publicity for the insurance company or other sponsoring enterprise. It is thus to be appreciated that a camera structure which is self bracing is very strongly preferred, to ensure reasonably accurate focus—i.e., to provide correct spacing between lens and photosensitive medium.

Taken together, these several characteristics create and open an entirely different and new market of extremely high-volume distribution and use, for the public benefit as well as for profit. Fullest enjoyment of the potential, for such very-high-volume distribution as an emergency tool, demands also that such a camera be extremely inexpensive.

It is further to be appreciated that these desired characteristics tend to be mutually inconsistent. Bracing is most generally effectuated by addition of structural elements, adding thickness and bulk—and complexity and cost as well.

My self-bracing camera, however, is only two or three thicknesses (depending on various design preferences) of paper or thin card stock, plus the thickness of a lens and shutter mechanism. To complete this assembly I have developed a lens and shutter that are about the thickness of a dime; so that the thickness of the entire camera is roughly 3 mm, or ⅛ inch.

With this informal introduction in mind, I shall now present a somewhat more rigorous definition.

A preferred embodiment of my invention is a camera, used for photographing a scene. It includes a body of sheet material. This may be paper, thin card stock, or plastic or like material.

When in a storage condition the camera body has two substantially planar and parallel panels. When in a usage condition it has four intersecting, substantially arched panels.

It will be understood that the phrase "substantially arched panels" encompasses—for purposes of this document and particularly the appended claims—panels that are roughly or substantially cylindrical segmental; but the panels need not be cylindrical, or even (strictly speaking) continuously curved. Other curves approximating cylinders, and in fact even several planar or nearly planar panels arranged in sequence, will serve as well—within the scope of the detailed disclosure that follows.

The camera also includes a light-sensitive medium held within the body. Such a medium can be a discrete piece of ordinary photographic film, or if the additional thickness is acceptable a self-developing film-and-chemical lamination. For extreme thinness, on the other hand, the photosensitive medium may be an emulsion coated directly onto a rear panel of the camera body itself; in this case some provision must be made for obtaining a print from the exposed emulsion.

For example, a positive photographic emulsion may be used, so that the emulsion and back panel themselves become a photo print—which can be easily viewed with an inexpensive hand magnifier, or rephotographed to make a larger print. Alternatively, using a negative emulsion, the rear panel may be made in such a way that it later can be dissolved away, or rendered transparent or reflective, or otherwise processed so that after the emulsion is developed a projection print (most typically an enlargement) can be made from the emulsion.

The camera also includes, mounted to the body, a lens for focusing a scene onto the light-sensitive medium. The camera also incorporates a shutter mechansim for controlling passage of light through the lens.

The foregoing may be one definition of a preferred embodiment of my invention in its broadest or most general form. The use of panels that are arched segments imparts to my camera an extraordinary strength, and particularly stability, that is almost astounding in view of the extreme thinness and simplicity of the construction.

As will be appreciated, other definitions—emphasizing other innovative structural or process features of preferred embodiments—may be equally valid. Such other definitions have been included in the appended claims.

For fullest enjoyment of the benefits of my invention, I prefer to practice it with certain additional features or characteristics. In particular, I prefer that the camera include scores formed along substantially curved lines in the sheet material.

It is very convenient to make these lines substantially circular-segmental. Since it is these scores, however, that lead to formation of the arched panels discussed earlier, it will be appreciated that the terminology "curved lines" also encompasses—for purposes of the appended claims and other portions of this document—lines that are not circular, and even lines that are not, strictly speaking, continuously curved.

Rather the lines encompassed within my phrase "curved lines" can be, for example, parabolic, elliptical, hyperbolic, or in fact even arbitrary curves not corresponding to any simple equation; or even lines compounded from, e.g., straight segments, or some curved segments and some straight segments. The resulting generally arched shapes confer, to a greater or lesser degree, the strength and stability that characterize my invention.

Squeezing together of two opposite edges of the camera body, when the body is in the storage condition, forces the sheet material to fold along the scores and to pop into the four arched panels—placing the body in the usage condition. Two of the arched panels have predefined widths to space apart the other two—and thereby the lens and the light-sensitive medium—substantially correctly for focusing of such a scene by the lens onto the light-sensitive medium.

I also prefer that two of the arched panels be mutually opposed and concave outward; while two others, which are also mutually opposed, are convex outward. The concave-outward panels, when squeezed together, tend to brace and stabilize the convex-outward panels.

Conversely, the convex-outward panels brace and stabilize the concave-inward panels against being squeezed together too far. This feature in particular tends to prevent inadvertent defocusing. Hence the camera body is inherently relatively strong and stable in its usage condition.

As preferred embodiments of the apparatus of my invention include several unique features, I believe that my invention is subject to definition through a variety of distinct, independent approaches. For summary purposes, however, I shall turn now to embodiments of the method of my invention.

It is a method of manufacturing and distributing cameras to users. It includes the steps of:

(1) forming a flat assembly of plural layers of sheet material, with front and rear panels of a camera body defined therein, and subpanels for use by such a user in deforming the flat assembly to erect an exposure chamber therefrom;

(2) supporting a light-sensitive medium on the sheet material so as to be inside the camera body;

(3) mounting a shutter and lens mechanism on the sheet material for admission and focusing of light onto the light-sensitive medium;

(4) after the forming and supporting steps, sealing the assembly to form a flat chamber with the light-sensitive medium inside;

(5) repeating all the foregoing steps many thousands of times to provide many thousands of such chambers;

(6) printing many thousands of copies of a publication;

(7) after the repeating and printing steps, inserting each chamber between pages of a respective one of said copies of the publication; and (8) after the inserting step, forwarding each copy of said publication, containing the respective chamber, to a prospective user.

As will be apparent, this process is simply unequalled in capability to provide extremely useful interlocked single-shot emergency cameras to enormous numbers of people. Furthermore, this process does so at a cost per camera that is virtually trivial.

The foregoing eight steps may define a preferred embodiment of the process of my invention in its broadest or most general form. As with the apparatus, however, I prefer to practice the process with certain additional features or characteristics that optimize its benefits and utility.

For example, I prefer that, in the forming step, one of the panels be extended to define a binding tab; and that after the folding step the binding tab extend from the assembly. I further prefer that after the sealing step the binding tab extend from the chamber; and that in the inserting step the binding tab extend from the chamber into portions of the pages to be bound—and, finally, that after the inserting step, the publication pages and the binding tab be automatically bound together to form a bound publication with the chamber secured therein.

All of the foregoing operational principles and advantages of the present invention will be more fully appreciated upon consideration of the following detailed description, with reference to the appended drawings, of which:

BRIEF DESCRIPTION OF THE DRAWINGS

FIGS. 3 through 5 are respectively front, right-side and top orthographic views of the same embodiment in its FIG. 1 storage condition—FIG. 4 being an elevation in cross-section, taken along the vertical centerline 4—4 in FIG. 3; and FIG. 5 being a plan in longitudinal section, taken along the horizontal centerlines 5—5 in both FIGS. 3 and 4.

The thicknesses of the sheet material and the photosensitive medium are very greatly exaggerated in FIGS. 4 and 5, and in all the sectional views of this document, to most clearly show how the camera is assembled.

Figure 2:
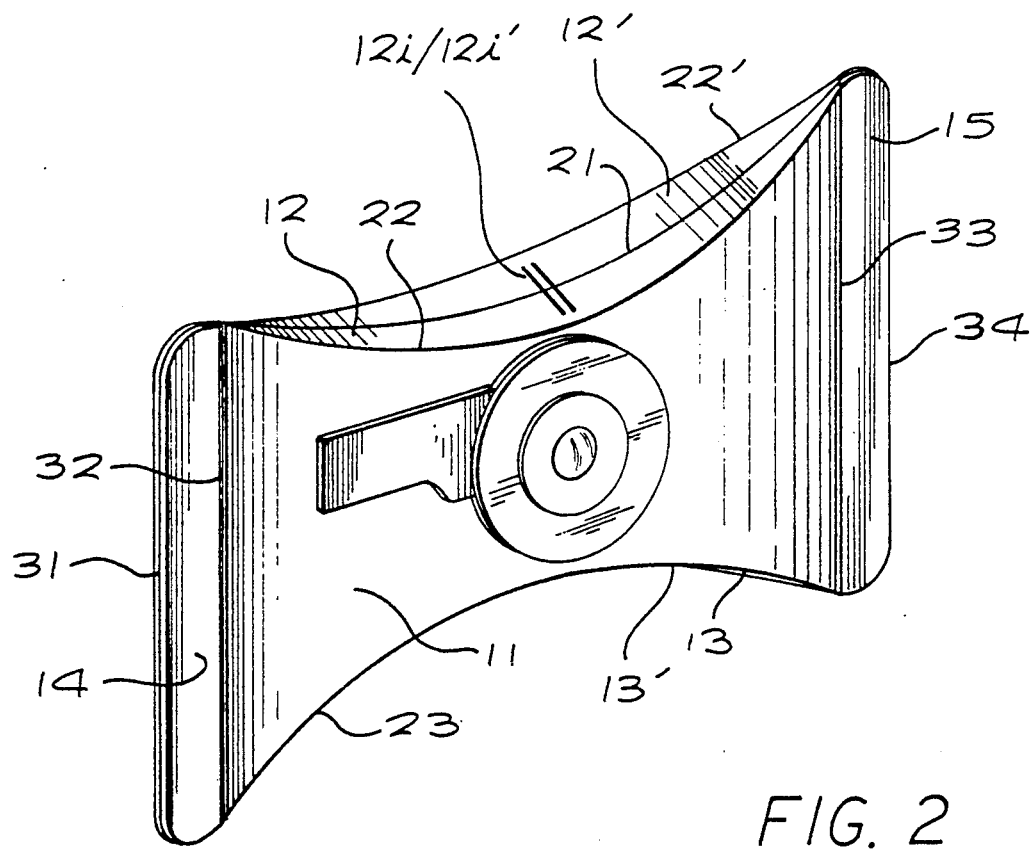
FIG. 2 is a like view of the same embodiment when deformed into its usage condition.
Figure 7:
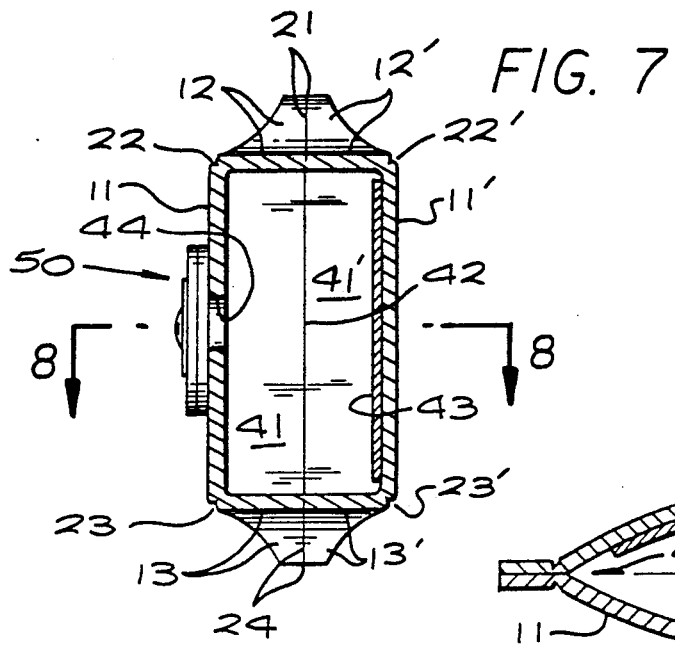
Figure 8:
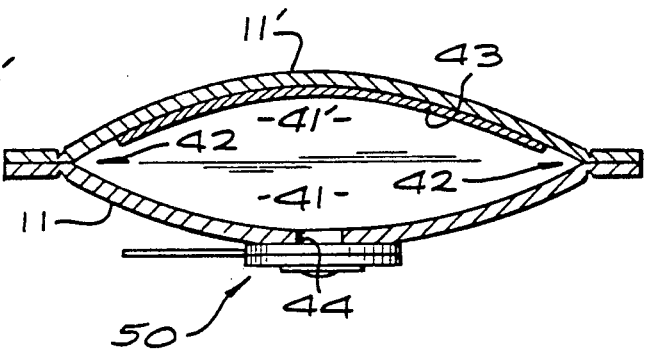

Analogously, FIGS. 6 through 8 are respectively a front elevation, a cross-sectional elevation, and a longitudinal-sectional plan of the same embodiment in its FIG. 2 usage condition.

Figure 9:
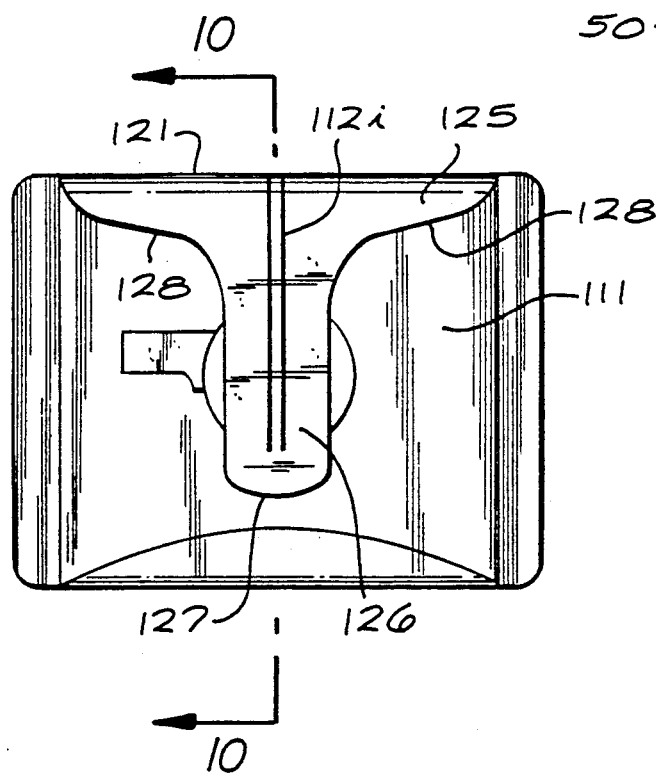
Figure 10:
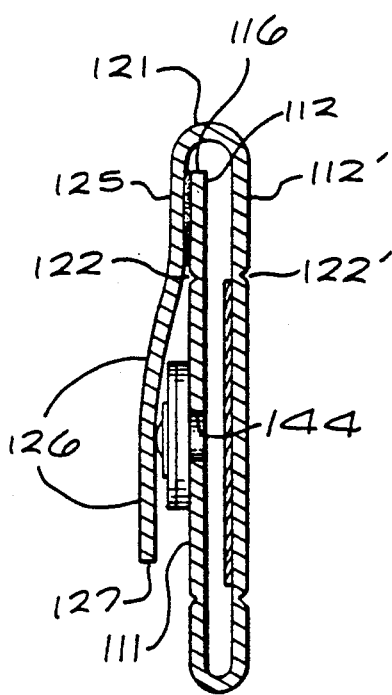

FIG. 9, analogous to FIG. 3, is a front elevation of another preferred embodiment, in its flat condition for storage. FIG. 10, analogous to FIG. 4, is a cross-sectional elevation taken along the vertical centerline 10—10 in FIG. 9.

FIGS. 11 and 12, analogous to FIGS. 6 and 7 respectively, are a front elevation and a cross-sectional elevation of the FIG. 9 embodiment, but now deformed into its usage condition. FIG. 12 is taken along the lines 12—12 in FIG. 11.

FIG. 13 is a top plan view of the same embodiment, in its usage condition.

FIG. 14 is a longitudinal-sectional plan of a variant construction that may be used for the left and right ends of the camera body, with the preferred embodiment of FIGS. 9 through 12—in place of the construction shown in FIG. 13. The section of FIG. 14 is taken along the lines 14—14 in FIGS. 11 and 12.

Figure 16:
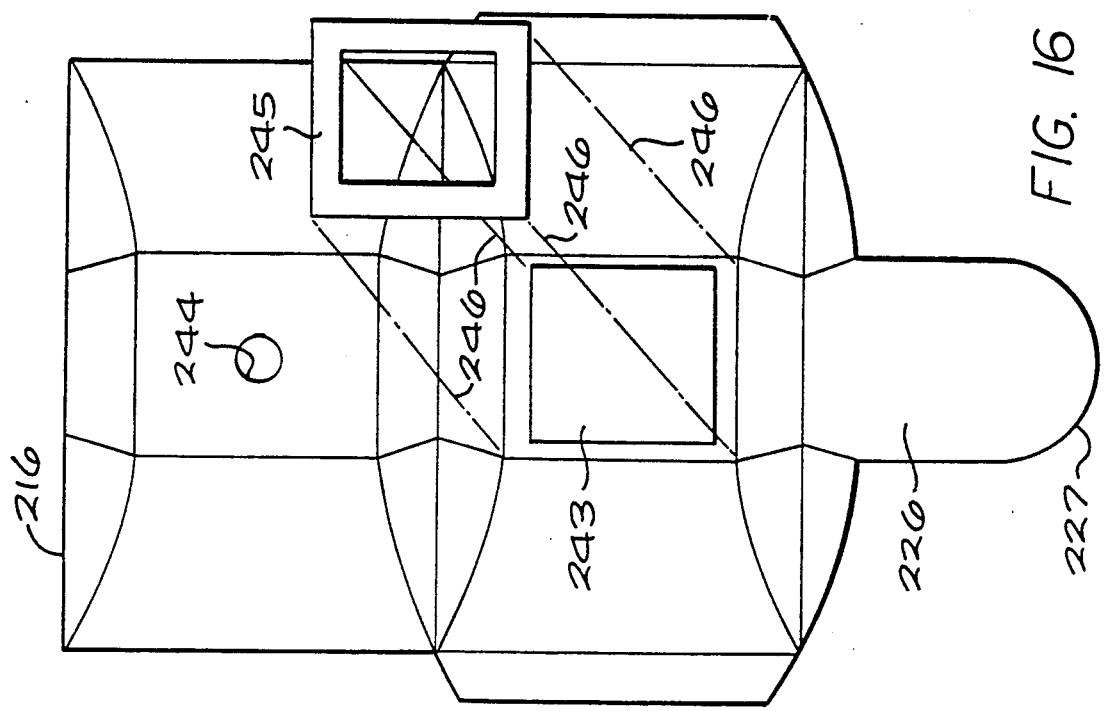
Figure 15:
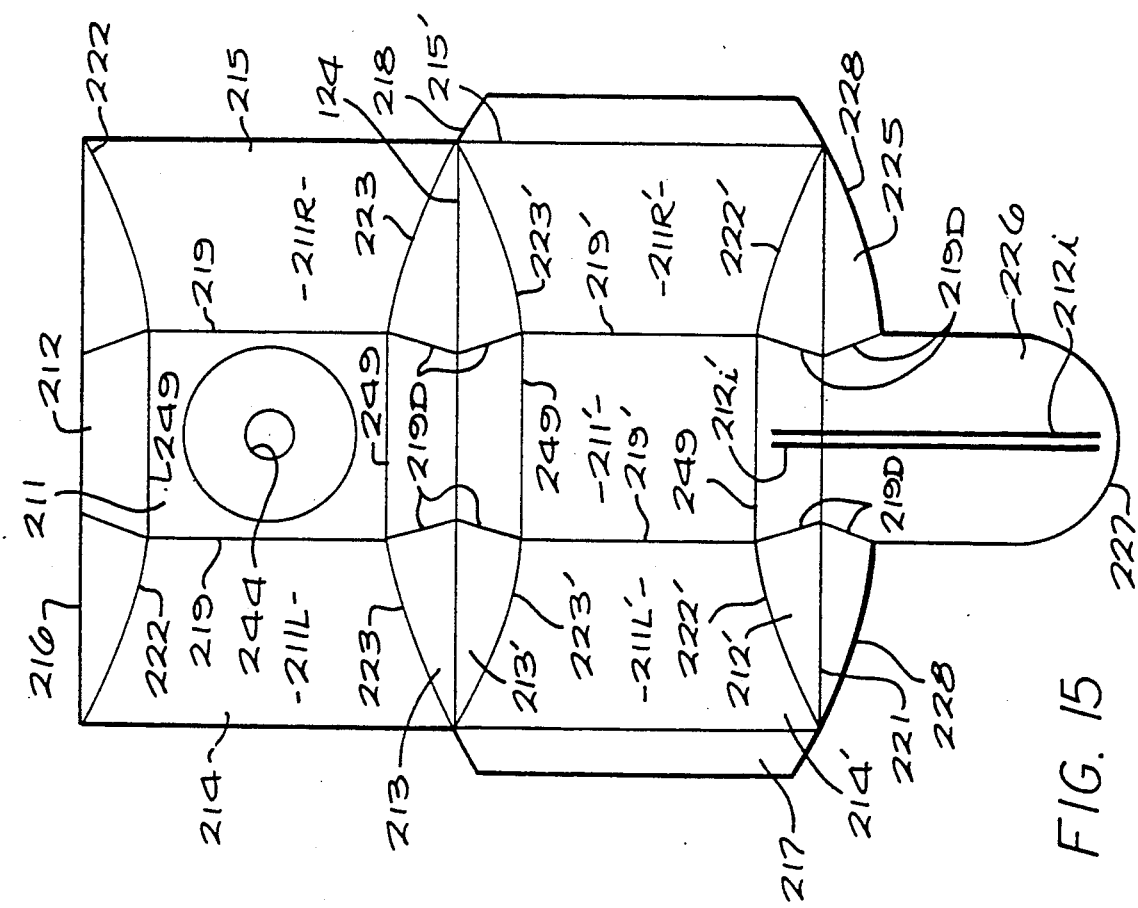

FIGS. 15 and 16 are respectively exterior and interior diagrammatic views of a sheet-material blank for use in fabricating the camera body of a preferred embodiment of my invention that is closely related to that of FIGS. 9 through 14. FIG. 16 further shows in exploded form certain assembly steps used to complete the camera.

Figure 17:
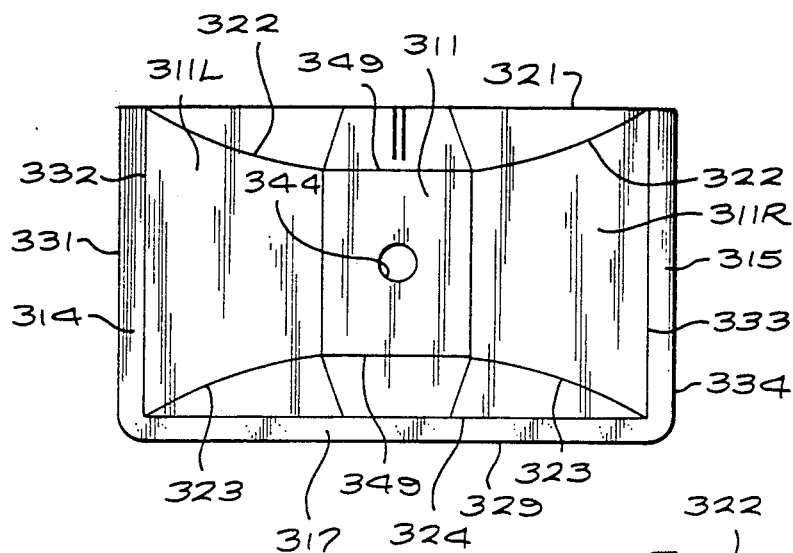

FIG. 17, analogous to FIG. 9, is a front elevation of a camera body for a third preferred embodiment, in its storage condition.

Figure 18:
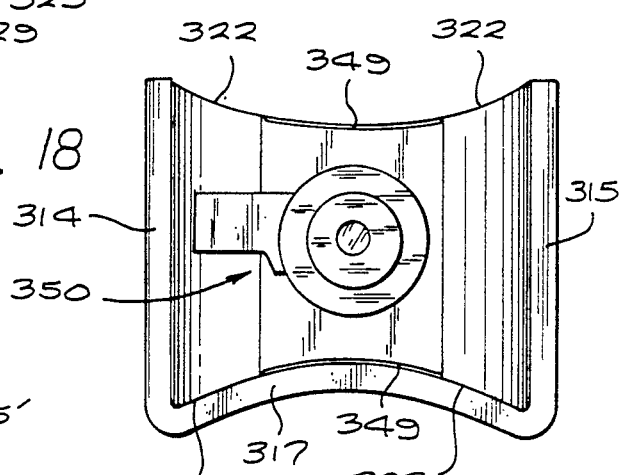
Figure 19:
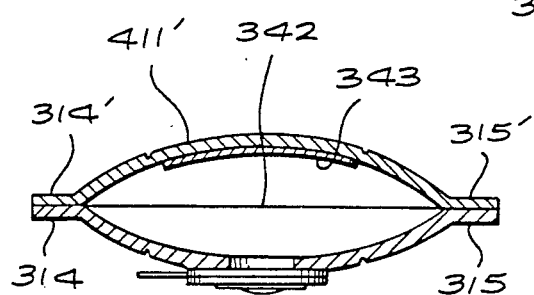

FIGS. 18 and 19, analogous to FIGS. 11 and 14 respectively, are a front elevation and longitudinal-sectional plan of the FIG. 17 third embodiment—but in its usage condition.

Figure 20:
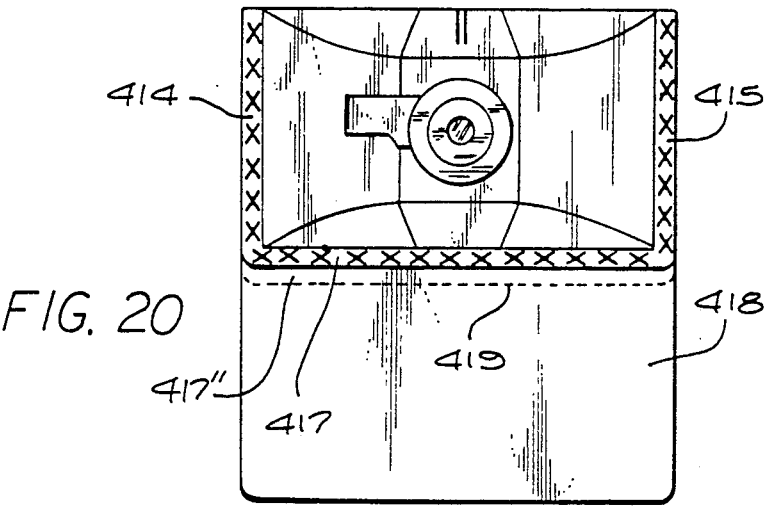

FIG. 20 shows a variant of the same FIG. 17 camera body in its storage condition, but with a lens and shutter mechanism assembled to it.

Figure 21:
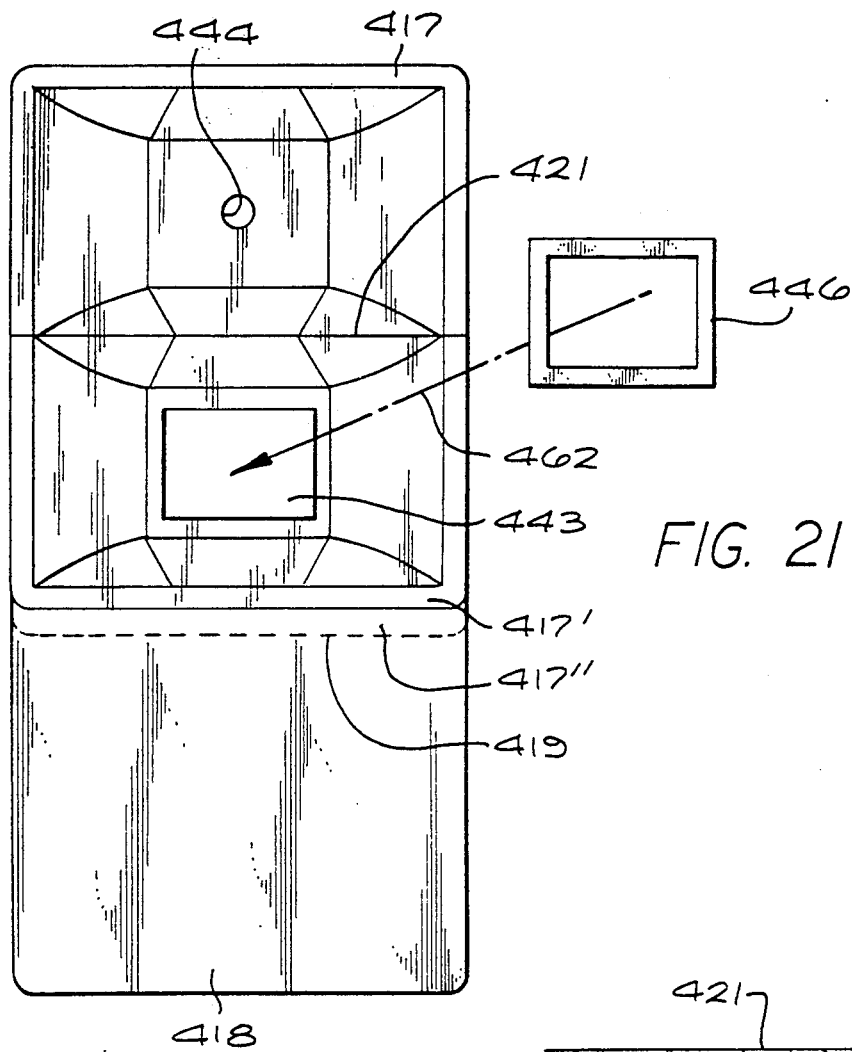

FIG. 21 is a diagrammatic view of a sheet-material blank for making the FIG. 20 variant embodiment; and further shows in exploded form certain assembly steps used to complete the camera.

Figure 22:
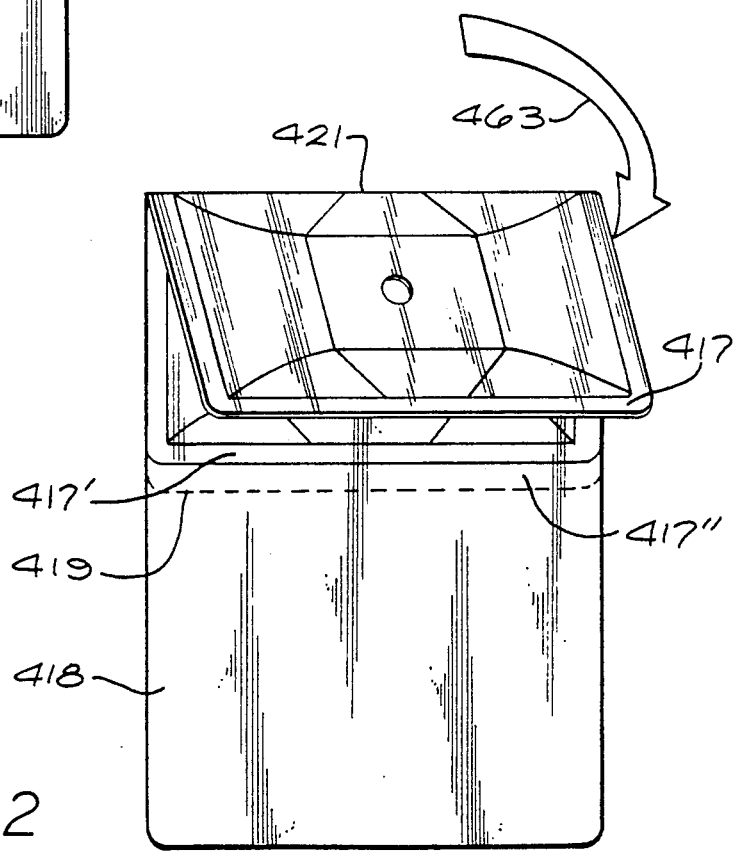

FIG. 22 is a perspective view showing a subsequent process step in completing the FIG. 20 variant embodiment.

Figure 23:
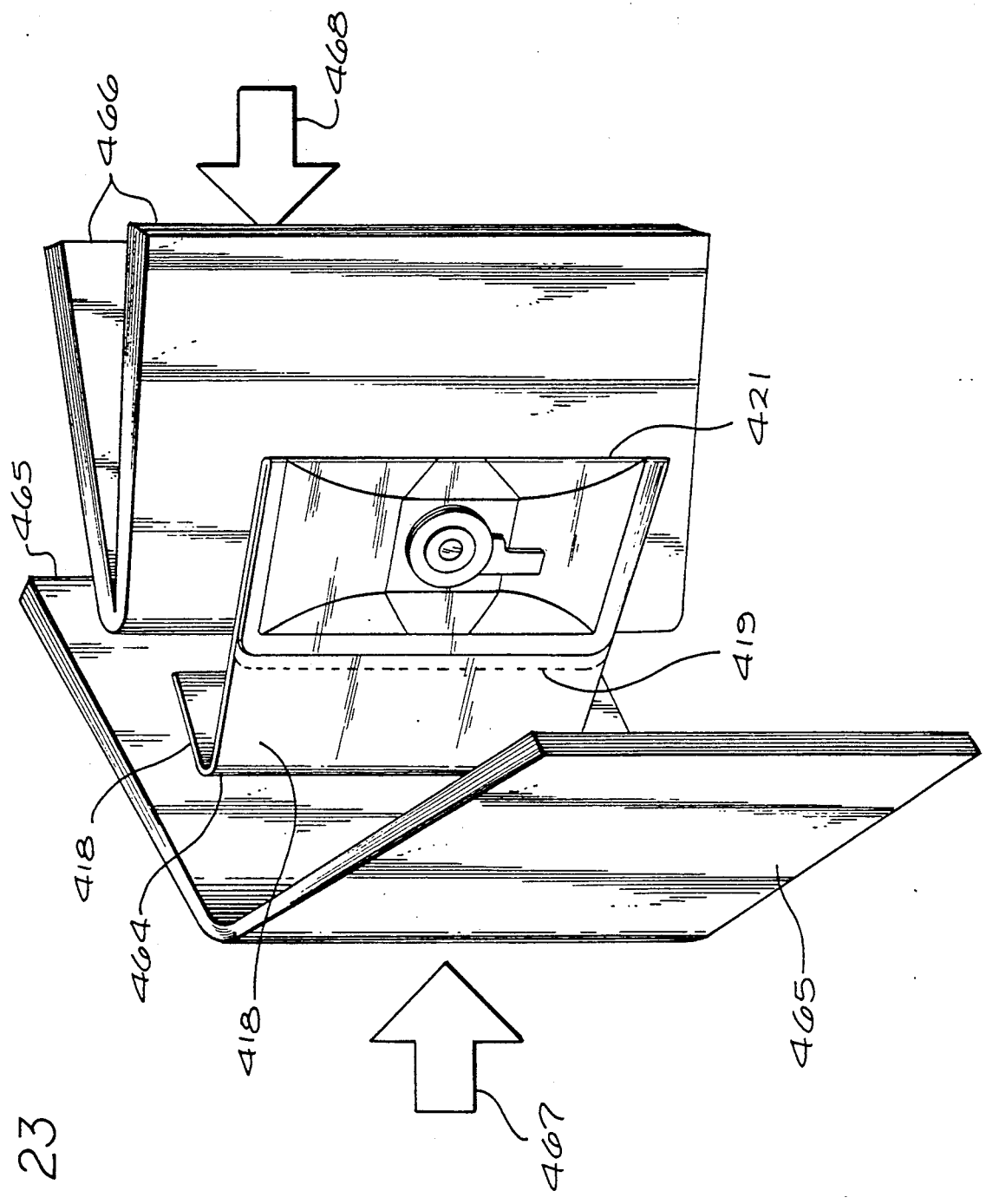

FIG. 23 is a like view showing a still later process step used in distributing the FIG. 20 variant embodiment.

Figure 24:
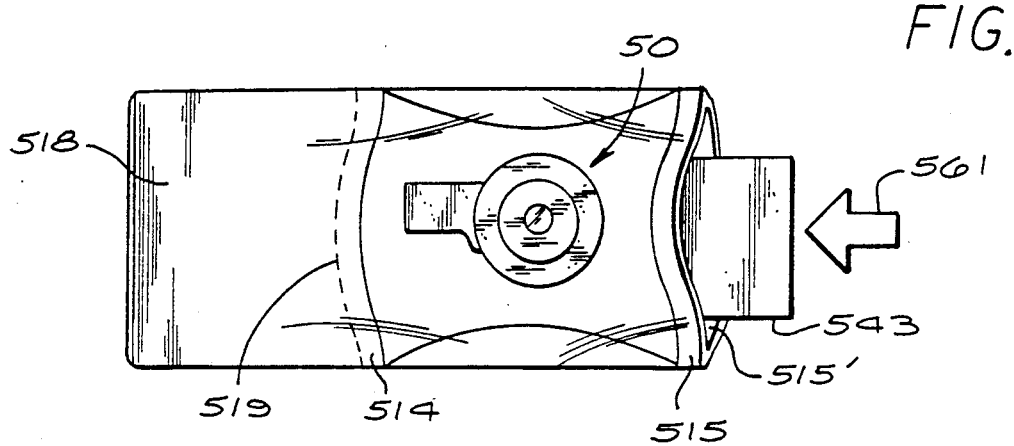
Figure 25:
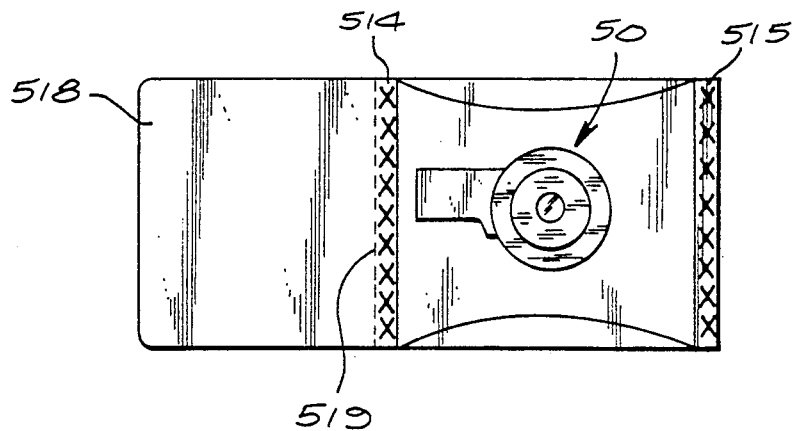
Figure 26:
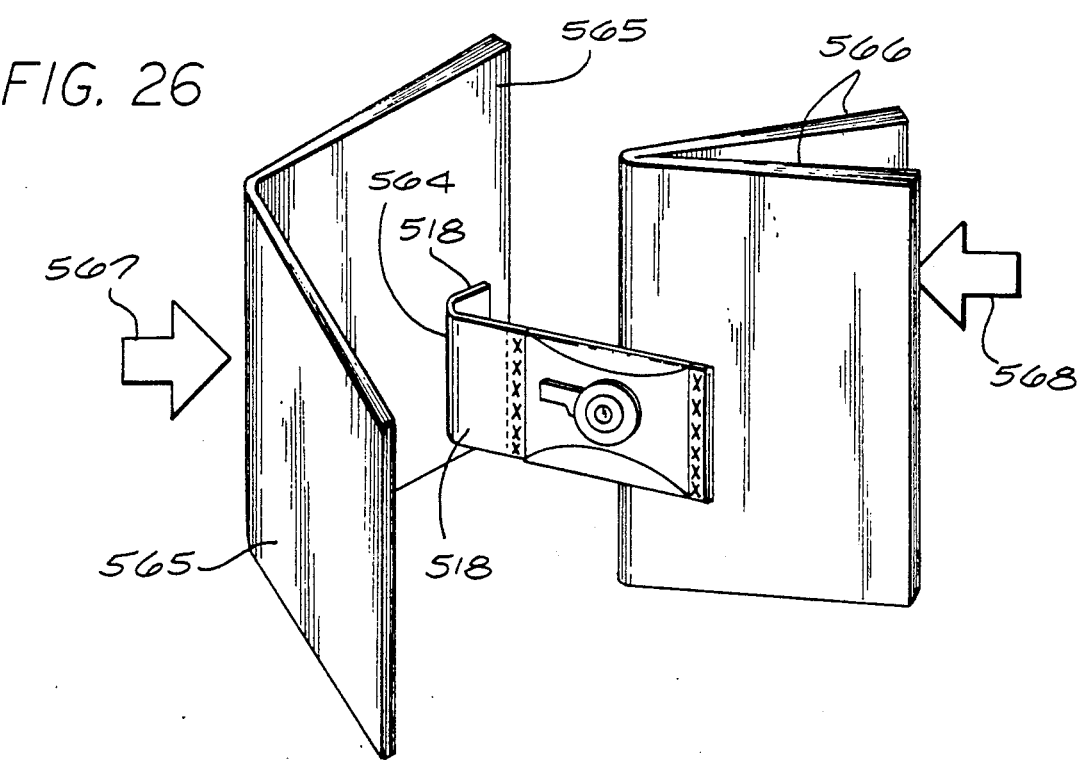

FIGS. 24 through 26 are like views showing, for the embodiment of FIGS. 1 through 8, process steps that correspond roughly to the steps represented in FIGS. 21 through 23 for the FIG. 20 embodiment.

Figure 27:
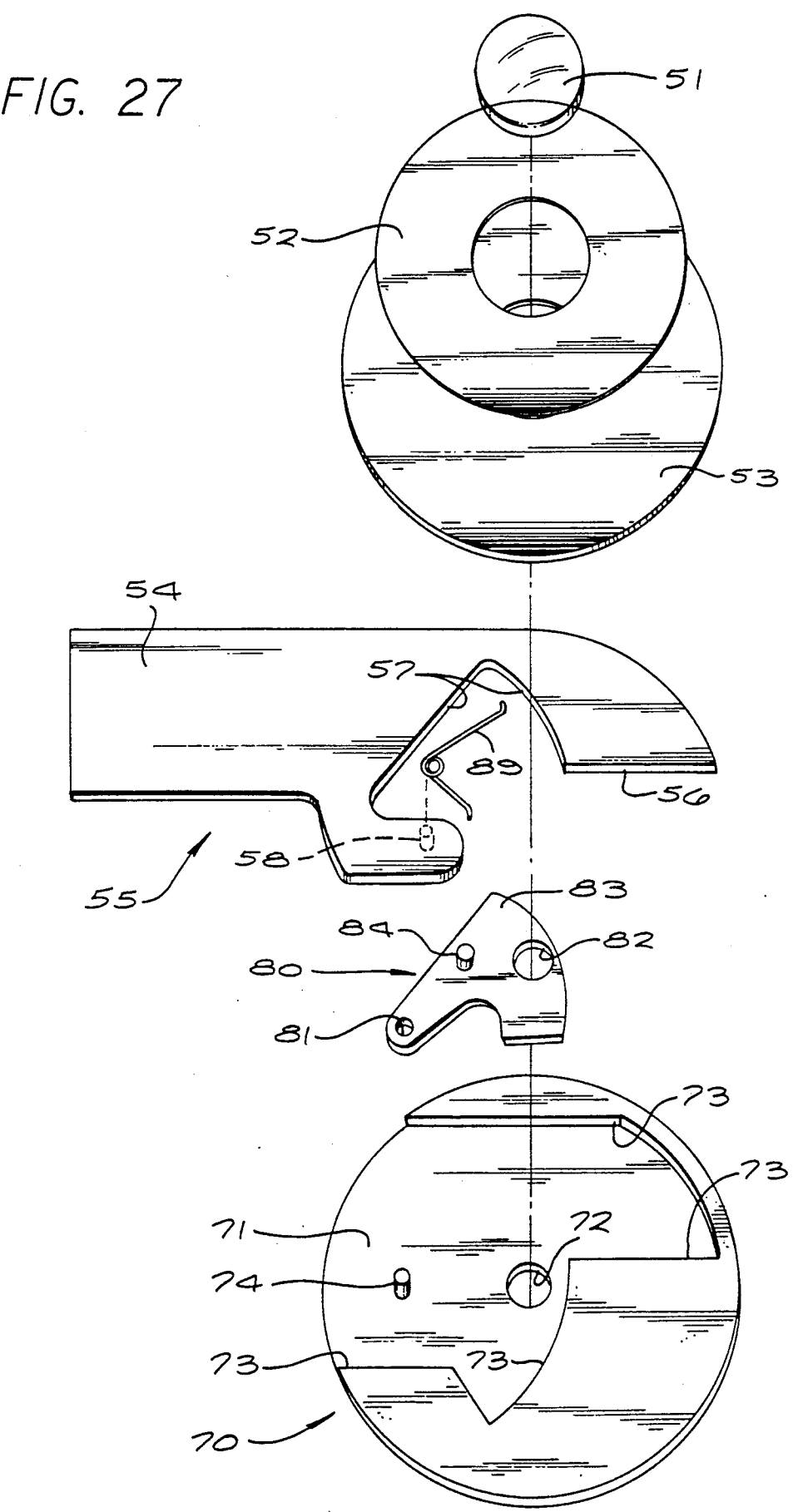

FIG. 27 is an exploded perspective or isometric view of a preferred shutter-and-lens assembly for preferred embodiments of my invention.

Figure 28:
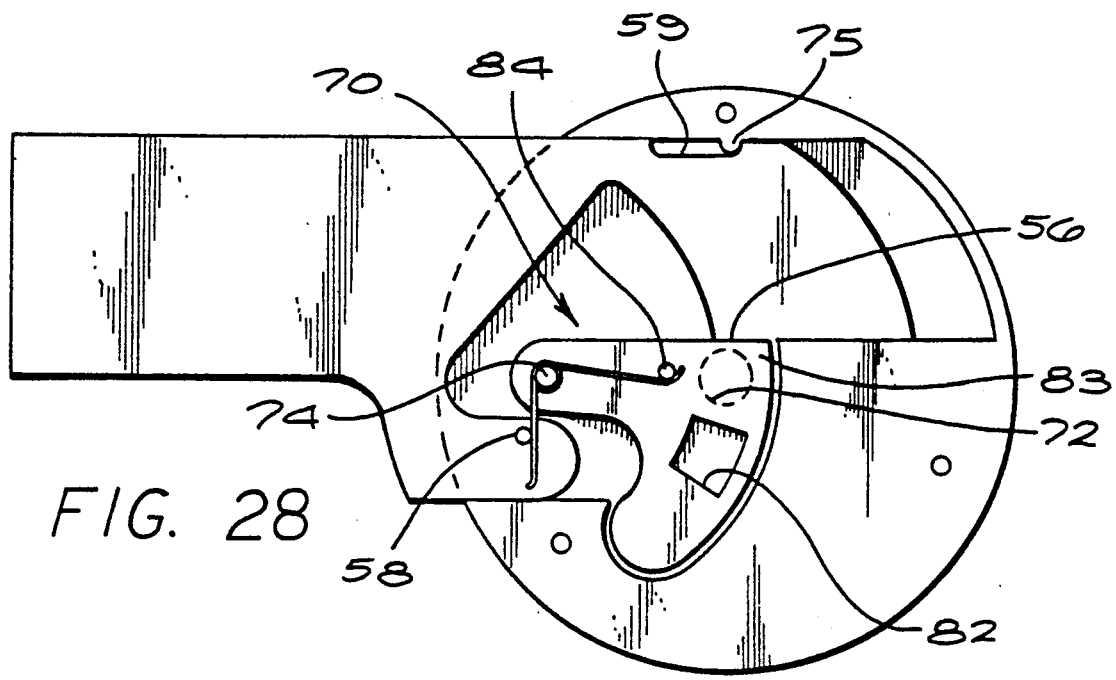

FIG. 28 is an elevation of the same apparatus assembled, before operation of the shutter.

Figure 29:
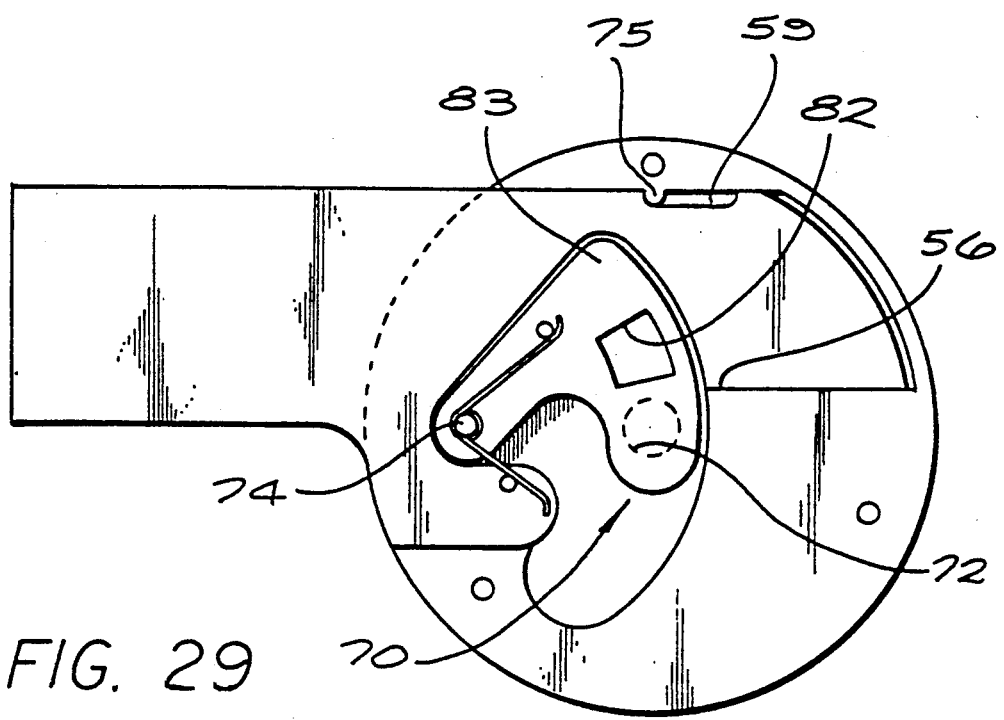

FIG. 29 is a like view of the apparatus after operation of the shutter.

DETAILED DESCRIPTION OF THE PREFERRED EMBODIMENTS

At present the sheet material which I prefer to use in my invention is paper. For brevity and definiteness I shall refer simply to paper hereinafter, although other sheet material may well be preferred for at least some applications.

FIGS. 1 through 8 show, simply for convenience of introduction, one preferred form of my invention that is conceptually the simplest construction, although as will be explained it may not be the most practical. In this embodiment of my invention the camera body, when it is in a storage condition (FIG. 1, and FIGS. 3 through 5), is a flattened tube, sealed along both ends.

Both ends 31, 34 of this flattened tube of paper are cut off at right angles, so that the camera body forms a substantially rectangular, generally flat article. The left and right edges 31, 34, however, are not functional and hence can be given arbitrary shapes—as may be desired for attachment to other products, or for thematic or esthetic reasons.

Narrow segments 14, 15 of the front wall of the tube, just adjacent to the left and right edges 31, 34 respectively, are sealed by adhesive or otherwise to the corresponding rear-wall segments 14', 15' (FIG. 5) to close the chamber 41. Next to the sealed segments 14, 14', 15, 15' are vertical scores 31, 31', 33, 33' respectively.

Two additional scores 22, 23 are formed in the front wall, along lines that are substantially circular segments. Substantially identical scores 22', 23' (FIG. 4) are formed in the rear wall.

Above and below the upper and lower scores 22, 23 respectively are circular-segmental top and bottom areas 12, 13. Substantially identical areas are defined above and below the like scores 22', 23' at the rear. Between the front pair of scores 22, 23 and also between the rear pair of scores 22', 23' are central panels 11, 11'—each somewhat the shape of a wide-waisted hourglass, on its side.

The camera body itself that is shown in FIGS. 1 through 8 is essentially two layers of paper thick at every point, ignoring some possible additional thickness along the top and bottom edges 21, 24 where the paper folds over on itself. Added to this, however, is the thickness of a light-sensitive medium 43 (FIGS. 4, 5, 7 and 8) centrally disposed on the rear wall 11' (FIGS. 4 and 5) within the body; and a shutter and lens assembly 50 disposed on the outside of the front wall 11.

The light-sensitive medium—whether fastened or coated to the interior of the rear wall—preferably does not extend above or below the substantially circular-segmental scores in the front and rear walls. As will be seen, this constraint minimizes distortion of that medium when the body is deformed for use.

To effect that change, a person squeezes the top and bottom edges 21, 24 toward one another, forcing apart the top scores 22, 22' on the front and rear walls respectively; and at the same time forcing apart the bottom scores 23, 23' on the front and rear walls respectively. As these scores move apart, the angle between the two top circular-segmental areas 12, 12' decreases until they become substantially one unitary surface, geometrically speaking; and the same is true of the two bottom circular-segmental areas 13, 13'.

Simultaneously the front and rear hourglass-shaped panels 11, 11' are forced to bulge outward and thus apart from one another. The distance is greatest near the vertical centerline of the camera body, and least or nearly zero near the mutually sealed vertical strips 14, 14' and 15, 15'.

This outward-arched condition is created by the circular segmental areas 12, 12'/13, 13'. (These areas are now bilateral—that is to say, they are curved outward in both directions from their respective centerlines 21, 24.) At the same time those areas 12, 12'/13, 13' are forced into an inward-arched condition by the hourglass shapes of the front and rear panels 11, 11'.

The result, as can be seen in FIG. 7, is a chamber whose cross-section near the vertical centerline is very nearly rectangular. The depth of this chamber at that point is well defined by the combined widths of the adjacent pairs of circular-segmental areas 12, 12' at top and 13, 13' at bottom—which respectively form the ceiling and floor of the chamber.

Unlike the Reed cameras and other bellows configurations discussed earlier, the depth of the chamber in my camera body is very little sensitive to oversqueezing by the preson who prepares the camera for use. I believe that there are two reasons for this.

First, in my camera the left and right end panels 14, 15 do not compress vertically, but rather remain extended to their full height, and they strongly resist—by virtue of the diverging immediately adjacent front and rear panels—any tendency of their top and bottom ends to bend toward the center of the body.

Hence the end panels 14, 15 act as masts supporting the ends of the top and bottom panels 12/12', 13/13'. These top and bottom panels act as tensioned elements suspended between the masts. These cable-like panels resist the force by which they are squeezed together. The dimensions of my camera body are such that this resistance becomes considerable when the front and rear panels are just fully extended.

Second, the front and rear panels form curved support walls for the top and bottom panels. These curved or arched support walls, which as mentioned earlier may be roughly cylindrical-segmental, strongly resist vertical crumpling. Hence, when the top and bottom panels are squeezed together—since the thumb and forefinger used to perform this function generally extend both forward and back beyond the front and rear panels—any excess squeezing is expended against these relatively very strong support walls.

Another way to explain the surprising strength and stability of my camera body is that, as can be seen in FIGS. 2, 6 and 8, its opposed top and bottom panels 12/12', 13/13' have substantially the shape of outward-concave arched segments; while its opposed front and rear panels 11, 11' have substantially the shape of outward-convex arched segments.

These elements are each relatively strong to begin with, because, as is well, known arched shapes have inherent resistance to various crumpling or torsional stresses. For roughly cylindrical forms such resistance is very good.

This is only a beginning in my camera body, however, for here two pairs of arched shapes—both of which may be close to cylindrical—are intersecting at right angles. Each of these forms is arranged to stabilize and strengthen the adjacent ones.

Thus, while the arched front and rear panels strongly resist any undesired deformation of the top and bottom panels, the top and bottom panels conversely also strongly resist any undesired deformation of the front and rear panels.

Some complicated deformation of the paper itself may be required to supply so-called "lost motion" needed to complete the transformation from a substantially planar shape to a chamber that is three-dimensionally extended. As is very familiar, however, to persons skilled in the creation of three-dimensional articles from sheet material, most or substantially all of such complex deformation of the paper is only temporary.

Figure 1:
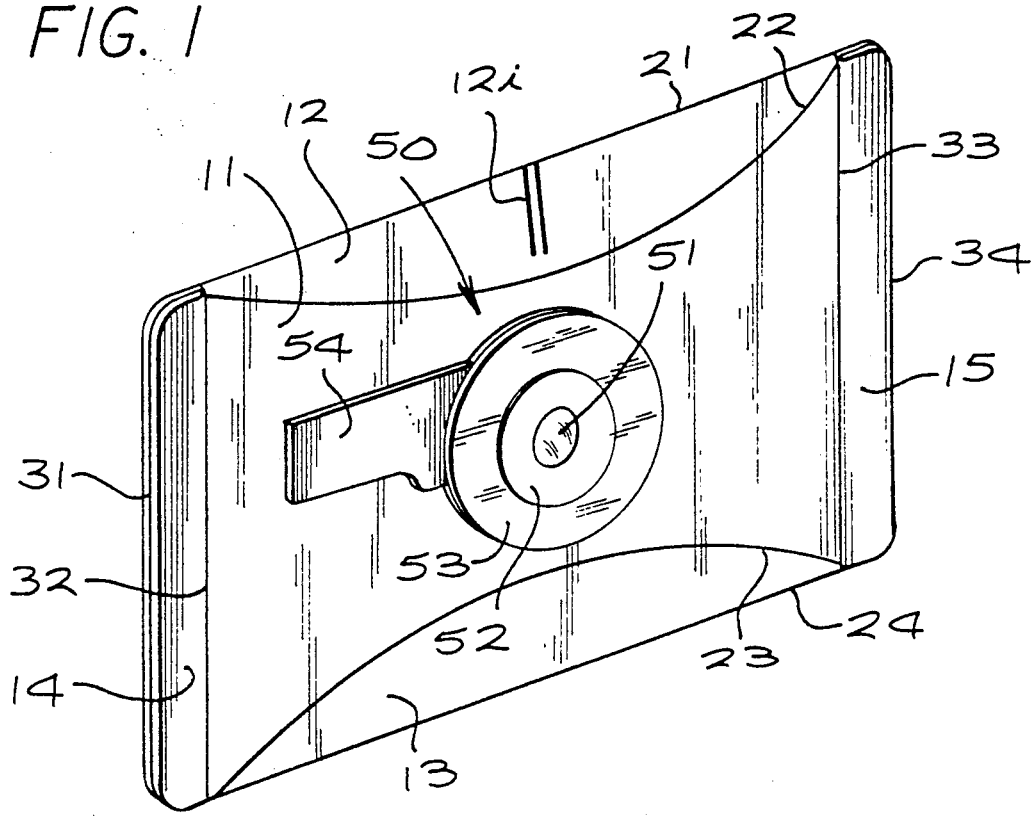
FIG. 1 is a perspective or isometric view of one preferred embodiment of my invention, when flattened in its storage condition.

The usage condition of FIG. 2 is produced from the storage condition of FIG. 1, as mentioned earlier, by squeezing the top and bottom edges 21, 24 together. This can be done in many ways, but for most users it will be most natural and comfortable to place the ball of the thumb across the bottom edge 24, and the ball of the forefinger across the top edge 21, and then being the thumb and forefinger together.

This manipulation ordinarily erects the camera body into its usage condition without difficulty. As will be appreciated, however, articles made of paper do not always operate completely smoothly. This is particularly true if they have been carried in a wallet, and thereby perhaps curled slightly in one unanticipated direction or another; or perhaps creased is some fashion not intended in design or at manufacture.

Most users, however, will find it intuitive to examine the camera body for such unintended "set" of the paper, and to correct such curling, creasing, etc.; and then to apply some additional bias gently to various parts of the camera body so that it starts to pop or erect itself into the usage condition of FIG. 2. Once this process is started, perhaps with added assistance from the user as described, as a rule the process will then continue in a straightforward fashion.

The user then holds the camera in the familiar, usual orientation of a camera for taking pictures, with the lens pointing toward the scene to be photographed. The user's grip is advantageously modified slightly by moving the forefinger just away from the horizontal centerline of the top panels 12, 12' to afford a clear view of an indicium 12i/12i' that is preferably provided on the top panels.

This indicium 12i/12i' is parallel with the horizontal centerline of the optical system—that is to say, a line passing through the center of the lens 51 and perpendicular to the surface of the photosensitive medium 43. Accordingly the user will find this indicium 12i/12i' helpful in pointing the camera.

The lens 51 is advantageously formed to provide focus from near-infinity to about eight to fifteen feet, in the usual fashion of a fixed-focus lens in a box camera. The aperture similarly is selected for nominally correct exposure in open shade to direct sunlight on a day of average brightness; the exposure will vary with the film type in ways that are very well known.

A paper or plastic tube is relatively expensive to make, and when flattened for storage can be difficult to provide with the desired "set" at the various scores. In addition, securing a photosensitive medium into a preformed paper or plastic tube may require very specialized and hence very expensive tooling.

For these reasons I now consider it preferable to make a camera body from a flat, single-layer paper blank that is folded over upon itself and then sealed to form a closed, flattened chamber. Various benefits and drawbacks result from this approach, as I shall explain in the following pages.

FIGS. 9 through 16 show one group of preferred embodiments of my invention that utilize such a flat blank. As most clearly shown in FIG. 10, a primary structural feature of these embodiments is the lap seal between the top section 112 of the front panel 111, 112, etc. and the rear face of a new overlapping panel 125.

In all of the drawings of this document, like two-digit reference numbers (e. g., "12", "25") have been used for the corresponding or analogous features of the camera—but with single-digit prefixes (e. g., here a numeral "1") added to distinguish the different major preferred embodiments. In view of the added information provided by this parallel numbering, I refrain from repeating descriptions of corresponding or analogous portions or features.

The top section 112 has substantially the same arched shape as the corresponding upper area 12 in FIGS. 1 through 8; but terminates in a straight horizontal top edge 116 and is covered (when viewed from the front as in FIG. 9) by the overlapping panel 125—which also has substantially the same arched shaped. The two panels are advantageously secured together, as by adhesive or the like, over substantially their entire common area.

In these embodiments another prominent feature, made possible by the overlapping construction, is an extension 126 of the overlapping panel 125. This extension 126 serves as an additional light shield and lens protector when the camera body is in its flat storage condition; and as a sunshade and camera-pointing aid when the camera is its usage condition.

To enhance its function as a pointing aid, the extension 126 is imprinted with an elongated indicium 112i-—similar to the corresponding indicium 12i of FIGS. 1 through 3. As in the case of that shorter indicium 12i, the elongated indicium 112i is aligned and continuous with an indicium 112i' (FIG. 13) on the upper portion 112' of the rear panel.

The extension 126 can if desired (and as illustrated) be made narrower than the camera body generally, though it need not be. This feature offers the esthetic advantage that the shaft 126 and tip 127 of the extension are essentially flat (see FIGS. 11 and 12), being projected forward from the central region of the inward-arched compound upper panel 112-112'-125. This central region is short enough to be nearly flat, as a practical matter, over its narrow width; and the small resulting curve tends to be flattened progressively more and more, outward along the narrow extension 126.

FIGS. 13 and 14 show two alternative variants for sealing the left and right ends of the camera body. FIG. 13 shows a simple parallel seal between the respective pairs of edges 114, 114' at the left and 115, 115' at the right.

This configuration has the advantage of minimum thickness at the edges, the two parallel segments at each end being simply sealed together over substantially their entire common area—as by adhesive or the like. This configuration is similar to that used in sealing the continuous-tube embodiment (see cross-section of FIG. 8), but differs in that the two layers are not mutually continuous with one another at top and bottom.

FIG. 14 shows a related sealing configuration in which the rear segment 214', 215' at each end is extended lengthwise into an additional tab 217, 218. Each tab 217, 218 passes around and over the edge of the corresponding front-panel segment 214, 215.

This arrangement could be used to provide a double-length, double-strength seal within the same camera-body overall length—by sealing at both surfaces, front and back, of each front-panel segment 214, 215. I prefer, however, to seal only at the front surface.

In other words, in the form of this variant which I prefer, only the extension tabs 217, 218 are sealed to the front-panel segments 214, 215. This allows the rear-panel segments 214', 215' to separate from the corresponding adjacent front-panel segments 214, 215, all the way into the inside left and right ends of the cavity. Such separation can be helpful in obtaining the desired arched shapes of the front and rear panels in the most reliable and smoothly operating fashion.

In comparison with the continuous-tube embodiments of FIGS. 1 through 8, the folded-blank embodiment of FIGS. 9 through 16 are more susceptible to light leakage at the corners. This is true of the variants that are shown in both FIGS. 13 and 14.

The reason for this susceptibility is the relative length of the shortest distance through the seal, between the interior and exterior of the chamber. (I refer here only to the distance through the seal, not the distance through the paper—which with suitable pigmentation can be taken to be adequately opaque.)

In the continuous-tube embodiment first discussed, the interior and exterior of the chamber are separated through the seal by the full widths of the sealing areas 14, 15. In this configuration the light-leak path is quite long.

In the folded-blank embodiment now under discussion, however, by contrast the light-leakage path at the corners is inherently very short. This fact perhaps may be best appreciated from a study of FIGS. 11, 13, 15 and 16.

To minimize this drawback it is possible to employ various tactics—such as applying a slight extra amount of adhesive (preferably black, opaque adhesive) slightly inward from each corner—so that the opposing walls tend to stick together near the corners; and so that the space between them, at the points where they begin to separate, is occupied by a very small bulk amount of the adhesive. Alternatively, other light-blocking materials could be provided between the walls just inside the corners.

As will be appreciated, however, any such techniques tend to interfere with the smooth operation of the blank in deforming or popping from the storage into the usage condition. Therefore these modifications must be carefully evaluated and carefully employed as tradeoffs between performance of the blank as a dynamic structure and performance of the camera body as a light-tight chamber.

FIGS. 15 and 16 represent a blank used to produce the second (FIG. 14) variant of the folded-blank embodiment. This blank has not only the extension tabs 217, 218 just discussed (FIG. 14), but also certain modified shapes and additional scores.

In particular, this embodiment may include optional additional vertical scores 219, 219' on the front and rear panels respectively; these scores may be continued across the arch-shaped upper and lower areas 212, 212', 213, 213' by slightly angled or diagonal gusset scores 219D. In addition, the two pairs of curved corner-to-corner scores 222, 223, 222', 223' (which define the arch-shaped upper and lower areas) may optionally be interrupted in their central segments by substantially straight scores 249.

The result of these various modifications is that the arched shapes of the front and rear panels are not substantially continuously curved, across the entire distance between the left and the right ends of the camera body. Rather, much flatter, or at least less strongly curved segments are formed occupying generally the central third of each of the front and back panels.

Such flatter segments may accommodate in a more stable and satisfactory fashion the attachment of a shutter/lens assembly outside the front panel, or attachment of film inside the rear panel. In addition the flatter front and rear panels may add a desirable accent or esthetic note.

As can be seen, these somewhat flatter panels do not deviate greatly from the curved paths shown earlier; and so the overall shapes of the scores and of the areas they define remain substantially arched. Introduction of flatter panels accordingly interferes only very minimally, if at all, with the previously explained benefits of the arched lines and surfaces.

On the other hand, the anticipated advantages of these flatter panels are also minimal or marginal. On balance, my present preference is to omit the optional straight scores 249, 219D; but I believe that all such variations and elaborations remain within the scope of my invention.

FIG. 16 also shows how the photosensitive medium 243 can be disposed upon the blank—between the upper and lower arched scores—preferably before the blank is folded over to form the camera-body cavity. The medium is placed on the side of the blank that will become the inside of the camera body.

If the sensitive medium 243 is a separate piece of film or the like and not self-adhesive, a rectangular adhesive mask 245 can be placed over the edges of the film to secure it to the blank. Lines of motion 246 (FIG. 16) suggest how the mask 245 is moved into place.

The third preferred embodiment of FIGS. 17 through 23, shown in variant forms, avoids both the difficulties of working with continuous paper tubes (FIGS. 1 through 8) and the potential for light leaks in the folded-blank embodiment just discussed (FIGS. 9 through 16). In its upper portions, this third embodiment is very closely similar to the upper part of the continuous-tube embodiment: the front and back panels are mutually continuous, being actually the same strip of paper folded over upon itself (see FIGS. 21 and 22).

As a result the light-leakage path in the upper corners is relatively quite long, just as in the continuous-tube configuration. That path in fact traverses the full width of the sealing areas 314, 315.

In the lower portions of the third embodiment, the sealing areas 314 and 315 are continued downward and entirely across the bottom of the camera body, as a continuing bottom-edge sealing strip 317. This arrangement thus maintains, at the bottom of the camera body, the same full-width leakage path just described for the top of the body—even though the bottom front and rear panels are not mutually continuous as the top panels are. To emphasize this feature I have shown in FIG. 20 by a series of small "x" marks that the seal is continuous along the entire sealing area 414-417-415.

A minor drawback of this configuration is that the parallel sealed seam 317 running across the bottom of the camera body must deform into a vertically arched shape when the body is squeezed or popped into its usage condition (FIG. 18). That parallel seam 317, being a double layer, is relatively stiff and strong in the vertical direction and accordingly resists being bent or arched vertically—i.e., in the plane of the seam itself.

The double-thickness seam 317 can, however, be folded backward or forward against or at least toward the adjacent panels, so that after deformation to the usage condition the paper that forms the seam need only be curled, or curved out of its own plane, rather than arched in its own plane. This maneuver may be slightly awkward for some users, particularly near the lower corners 314–317 and 317–315; but I believe that this awkwardness can be minimized by illustrated instructions.

Here as in the second embodiment discussed earlier, additional vertical and gusset scores 349 can be provided. At present, however, for the reasons previously mentioned, I do not favor doing so.

In the variant of FIG. 20, the rear panel (not visible in FIGS. 17 through 19) is extended very slightly downward to form a narrow skirt 417″ and a binding tab 418, separated from one another by a perforation 419. The binding tab is for use in fastening the camera body into the binding of a magazine or like publication.

The skirt 417″ is not strictly necessary, but spaces the perforation slightly away from the seam 417. This preserves the integrity of the seam when the binding tab 418 and camera body are torn away from each other.

FIGS. 21 and 22 indicate in greater detail the fabrication process for the FIG. 20 variant. As seen in FIG. 20, a blank is prepared in which the rear panel is formed as an exact mirror image of the front panel (except for the light aperture 444).

In the blank, the rear panel is immediately adjacent to the front panel. In fact, the front and rear panels are continuous—along the score 421 which will become the top edge of the camera body.

Below the lower sealing area 417′ are the skirt 417″, then the perforation 419 and finally the binding tab 418. Disposed upon the inside of the rear panel are first the photosensitive medium 443 and then, as appropriate, an adhesive retaining mask 446.

For simplicity of mechanized operations I prefer to put the light-sensitive medium in place before proceeding to fold the blank. In purest principle, however, that step need only be done before the blank is actually sealed to form the closed photographic chamber, for automatic equipment can reach into the prefolded blank if this is considered preferable.

The shutter and lens assembly 50 can be swaged or otherwise mounted to the front panel, aligned of course with the aperture 444 in the blank, either before or after the blank is folded. Securing the shutter and lens to the paper after the camera is otherwise fully assembled may damage the light-sensitive medium; on the other hand, folding the blank may be slightly more touchy after the shutter and lens assembly are attached.

In any event, after assembly is complete the camera body can be placed between pages of a publication, such as a magazine. The camera is thus distributed with the publication.

In certain types of publications, advertising materials are simply positioned, without being secured, between pages. For such publications, my camera could be distributed similarly—i.e., without being secured. If desired, extra friction to help retain the camera in place could be provided by including an attached tab, such as the illustrated tab 418.

I prefer, however, to positively secure the camera body into the publication by providing a binding tab 418; and by passing that tab through the binding area of the publication, and preferably actually binding the tab into the rest of the publication. This is indicated in FIG. 23, which shows the tab 418 folded along a line 464 (which if desired may be parallel to the perforation 419, though this is not at all necessary) and placed between an outer sheaf 465 and an inner sheaf 466 of sheets of the publication.

As also shown in FIG. 23, the inner and outer sheaves 465, 466 are moved toward each other (along directions respectively indicated by the two arrows 465, 468 in the drawing), thereby capturing between them the binding tab 418. The entire assemblage of pages and binding tab may then be bound conventionally (e.g. by stapling, stitching, or perfect binding) to firmly secure the camera body into the publication.

FIGS. 24 through 26 show the analogous processes for the continuous-tube embodiment. The primary difference here is that the light-sensitive medium 543 is necessarily moved, along the direction indicated in FIG. 24 by the arrow 561, into the already continuous tube or sleeve by insertion.

For this purpose the sleeve must be opened, temporarily separating the sealing strips 515, 515′ along one end of the body. A binding tab 518 and perforation 519 can be provided along both sealing strips 514 at the other end of the body, as also shown. Both ends are then sealed as indicated by the row of "x" marks in FIG. 25, and the sealed assembly then bound into a magazine generally as already described—and as shown for this embodiment in FIG. 26.

As will be understood, the paper used for the camera body should be made very opaque to prevent premature exposure of the photosensitive medium during long periods of storage. To this end the paper itself when made can be infused with ample amounts of dark pigment; or the paper may later be soaked in pigment, or simply painted—e.g., spray painted. I prefer to paint the inside of the fold-up blank before folding.

It remains to describe the shutter and lens assembly. As shown in FIG. 27, the assembly includes a lens 51, lens-retaining decal 52, cover plate 53, escapement plate 55, shutter plate 80, and base 70.

The base 70 is fixed to the camera body at the circular perforation or aperture 444 (FIG. 21), 344 (FIG. 17), 244 (FIGS. 14 and 15), 144 (FIGS. 10 and 12) or 44 (FIG. 7) in the front panel. The base 70 defines a guide recess 71 (in which the escapement and shutter plates 55, 80 both operate), and an optical aperture 72 aligned with the circular perforation 44, etc. in the front panel. Held in the base is a pivot pin 74.

The shutter plate 80 is mounted for rotation within the guide recess 71 and about the pivot pin 74. It defines an exposure orifice 82 for passage across the optical aperture 72 in the base 70.

The assembly also includes a spring 57 for biasing the shutter plate 80 to rotate about the pivot pin 74, between a cocked position and a released position—to pass the exposure orifice 82 across the optical aperture 72 in the base 70, and thereby also across the circular perforation or aperture 44, 144, 244, 344, 444 in the front panel.

The escapement plate 55 is mounted for sliding operation within the guide recess 71, between a cocked position and a released position. The plate 55 has an actuator portion or arm 54 that is manually operated (toward the right, in FIG. 27 as drawn), a shutter-plate blocking portion 56, and a shutter-plate receiving portion 57.

When the escapement plate 55 and shutter plate 80 are in their respective cocked positions, the shutter-plate blocking portion 56 has a mutual interference with a leading corner 83 of the shutter plate 80. Initially the escapement plate 55 is disposed in the cocked position; in this position the mutual interference prevents rotation of the shutter plate 80 to pass the exposure orifice across the apertures 72, 44, etc.

To operate the camera, a user pushes the actuator arm 54 and thereby the escapement plate 55 so that its shutter-plate receiving portion 57 moves into position to receive the shutter plate 80. In this way, manual operation of the actuator arm 54 releases the shutter plate for rotation by the spring into the receiving portion 57 of the escapement plate, passing the exposure orifice across the optical aperture.

Once that has occurred, the shutter plate 80—by virtue of the same mutual interference between the shutter plate and the blocking portion of the escapement plate, obstructs reverse operation of the escapement plate toward its cocked position. Meanwhile the spring biases the shutter plate to remain in the receiving portion of the escapement plate, and so to continue obstructing reverse operation of the escapement plate.

The coverplate 53 and lens 51 shield the entire shutter mechanism and thereby prevent inadvertent (or even, to a certain extent, deliberate) counterrotation of the shutter plate to reexpose the sensitive medium, or to recock the shutter and escapement plates.

From FIG. 28 it may be appreciated that before the user begins to advance the escapement plate the spring 58 is in a relaxed or uncompressed condition—i.e., relatively open. Thus the spring 58 is not stored for very long periods of time under stress.

The spring is thereby to an extent preserved against metal fatigue and other types of damage that might interfere with propulsion of the shutter at the correct speed to obtain a correct exposure—or might even prevent operation altogether. If the escapement plate is inadvertently advanced partway, the spring tends to help restore the escapement plate to its fully outward, cocked position.

When the escapement plate is advanced to release the shutter, the first segment of the motion of the plate moves forward a spring-actuating boss 58 that is carried on the plate 55. This boss engages one side of the spring 70, while a like boss 84 on the shutter plate engages the other side of the spring. The spring itself is stabilized by being looped about the previously mentioned shutter-plate pivot pin 74.

Forward motion of the boss 58 compresses or arms the spring. The mutually interfering portions 56 and 83 of the escapement and shutter plates respectively, however, continue to obstruct operation of the shutter plate while the stress in the spring builds up to a calibrated value.

After the spring is fully armed, a slight further motion of the escapement plate causes the interfering portion 56 of the escapement plate to clear the interfering portion 83 of the shutter. The shutter plate then snaps positively past the apertures and into the receiving portion of the escapement plate.

Another feature of my shutter apparatus is that the escapement and shutter plates operate closely within similarly shaped walls of the operating recess 71, as shown. This feature maximizes the length of light-leakage paths through the optical apertures 72, etc., and so minimizes premature exposure by that route.

I prefer to make my camera roughly 8½ by 5 by ⅓ cm (3⅜ by 2 by ⅛ inch) when collapsed in its storage condition, and 8¼ by 5 by 2 cm (3¼ by 2 by ¾ inch) when opened into usage condition.

The focal length is roughly 2¼ cm (⅞ inch); and the film is 16 or 35 mm film, roughly 3 cm (1⅛ inch) long.

The exposure for typical film is roughly 1/125 of a second at f/8.

It will be understood that the foregoing disclosure is intended to be merely exemplary, and not to limit the scope of the invention—which is to be determined by reference to the appended claims.

I claim:

1. A camera for photographing a scene, and comprising:
    a body of sheet material which when in a storage condition has two substantially planar and parallel panels, and when in a usage condition has four intersecting substantially arched panels;
    a light-sensitive medium held within the body;
    mounted to one of said arched panels, a lens for focusing such a scene onto the light-sensitive medium, and a shutter mechansim for controlling passage of light through the lens.

2. A camera for photographing a scene, and comprising: a body of sheet material which when in a storage condition has two substantially planar and parallel panels, and when in a usage condition has four intersecting substantially arched panels; a light-sensitive medium held within the body; mounted to the body, a lens for focusing such a scene onto the light-sensitive medium, and a shutter mechanism for controlling passage of light through the lens;
    scores formed along substantially curved lines in the sheet material;
    wherein squeezing together of two opposite edges of the camera body, when the body is in the storage condition, forces the sheet material to fold along the scores and to pop into said four arched panels to place the body in the usage condition; and
    wherein two of said arched panels have predefined widths to space apart the lens and the light-sensitive medium substantially correctly for focusing of such a scene by the lens onto the light-sensitive medium.

3. The camera of claim 2, wherein:
    two of the arched panels are mutually opposed and concave outward, and two others are mutually opposed and convex outward; and
    the concave-outward panels when squeezed together tend to brace and stabilize the convex-outward panels so that the camera body is inherently relatively strong and stable in its usage condition.

4. A credit-card-size, one-shot camera for storage in a wallet or the like, and inclusion and distribution in a magazine, envelope or the like; and for use by a person in making a photograph of a scene; and comprising:
    a body of sheet material which has a thickness, said body including:
        a rear panel that has a periphery and that carries, along an interior surface, a light-sensitive medium which has a thickness, and
        a front panel that is perforated to admit light to expose the light-sensitive medium, and that has a periphery whose entire length is substantially directly sealed to or directly continuous with the rear panel periphery;
    mounted to the perforated front panel, a lens for focusing such a scene onto the light-sensitive medium, and a shutter mechanism for controlling passage of light through the lens;
    the entire light-sensitive medium lying substantially directly against the front panel, lens and shutter mechanism, when the body is in a first condition for storage in such a wallet or the like;

wherein, when the body is in said first condition, the body has overall thickness, at said peripheries, not exceeding three thicknesses of the sheet material; and at the lens and shutter mechanism, substantially not exceeding two thicknesses of the sheet material plus one thickness of the light-sensitive medium, plus the thickness of the lens and shutter mechanism;

scores formed in the front and rear panels and defining:
upper portions of both the front and rear panels, mutually contiguous along said peripheries,
lower portions of both the front and rear panels, mutually contiguous along said peripheries, and
remaining front and rear intermediate portions between the respective upper and lower portions;

said upper and lower contiguous portions, when the body is in a second condition for making such a photograph, cooperating to define temporary top and bottom panels respectively; said temporary panels having predefined widths to space apart said remaining front and rear portions substantially correctly for focusing of such a scene by the lens onto the light-sensitive medium.

5. The camera of claim 4, wherein:
the shutter mechanism comprises an interlock device to prevent operation more than once.

6. The camera of claim 4, further comprising:
a lens cover of sheet material, substantially directly continuous with or secured to the upper portion of the front panel and extending downward in front of the lens;
wherein, when the body is in said first condition the camera has overall thickness, at the lens and shutter mechanism, substantially not exceeding three thicknesses of sheet material plus one thickness of the light-sensitive medium, plus the thickness of the lens and shutter mechanism; and
wherein squeezing of the camera body vertically, when the body is in the first condition, forces the upper and lower portions to flatten into said temporary top and bottom panels respectively, spacing apart said remaining front and rear portions to place the body in the second condition; and deploys the lens cover to a substantially horizontal orientation for service as an aiming sight and as a lens shade.

7. The camera of claim 6, wherein:
the shutter mechanism comprises an interlock device to prevent operation more than once.

8. The camera of claim 4, wherein:
the front and rear panels each have substantially straight top and bottom edges that are all mutually parallel; and the straight top and bottom edges each have left and right ends;
the scores extend along substantially curved lines, each extending between a pair of points near two ends of the upper straight edges or between a pair of points near two ends of the lower straight edges;
the upper and lower portions of the front and rear panels are substantially arch-shaped areas, each defined between a substantially straight top or bottom edge and one of the substantially curved scores;

when the body is in the second condition, the temporary top and bottom panels are substantially arched surfaces, concave upward and downward respectively; and the remaining front and rear portions are generally arched surfaces, convex forward and rearward respectively.

9. The camera of claim 8, wherein the camera body is formed from a single sheet of material which:
is folded along one horizontal straight line to form a common bottom edge of the front and rear panels;
is folded along another horizontal straight line to form a tab that extends downward at the front of the camera and is joined by glue or the like to form a part of the front panel; and
has two left-hand edges secured together by glue or the like, and two right-hand edges also secured together by glue or the like.

10. The camera of claim 4, wherein:
the front and rear panel are continuous with each other along a top or bottom edge of the camera body;
the front and rear panel are sealed flat against each other along substantially the entire remainder of the peripheries of the front and rear panels; and
the body has overall thickness, at said peripheries, of two thicknesses of the sheet material.

11. The camera of claim 10, wherein:
the lens and shutter mechanism further comprise a lens cover for protecting the lens in the first condition, and for deployment as a sunshade in the second condition.

12. The camera of claim 4, wherein:
the lens and shutter mechanism are disposed within a perforation in the front panel, and are fastened to the front panel within the perforation; and
the body has overall thickness, at the lens and shutter mechanism, of one thickness of the sheet material plus one thickness of the light-sensitive medium, plus the thickness of the lens and shutter mechanism.

13. The camera of claim 4, wherein:
the front and rear panel are continuous with each other along a top or bottom edge of the camera body;
the front and rear panel are sealed flat against each other along substantially the entire remainder of the peripheries of the front and rear panels;
the lens and shutter mechanism are disposed within a perforation in the front panel, and are fastened to the front panel within the perforation; and
the body has overall thickness, at said peripheries, of two thicknesses of the sheet material; and at the lens and shutter mechanism, of one thickness of the sheet material plus one thickness of the light-sensitive medium, plus the thickness of the lens and shutter mechanism.

14. A credit-card-size, one-shot camera for storage in a wallet or the like, and inclusion and distribution in a magazine, envelope or the like; and for use by a person in making a photograph of a scene; and comprising:
a light-sensitive medium for receiving and retaining an image of such a scene;
a camera body of sheet material that folds substantially flat for such storage or shipment, with the light-sensitive medium held within the body; and that unfolds to form a focal chamber for imaging of such a scene on the light-sensitive medium within the chamber;

a perforation formed in the body to admit light from such a scene;

mounted to the body, a lens for focusing such a scene onto the light-sensitive medium, and a shutter mechanism for controlling passage of light through the lens; said shutter mechanism comprising:

a base attached to the body at the perforation; said base defining a guide recess, a pivot pin, and an optical aperture that is aligned with the perforation;

a shutter plate mounted for rotation within the guide recess and about the pivot pin; said shutter plate defining an exposure orifice for passage across the optical aperture in the base;

spring means for biasing the shutter plate to rotate about the pivot pin to pass the exposure orifice across the optical aperture;

an escapement plate mounted for sliding operation within the guide recess between a cocked position and a released position, and having an actuator portion for manual operation; said escapement plate defining a shutter-plate blocking portion which, in the cocked position, has a mutual interference with the shutter plate;

the escapement plate being initially disposed in the cocked position, wherein said mutual interference prevents rotation of the shutter plate to pass the exposure orifice across the optical aperture; and the escapement plate also defining a shutter-plate receiving portion that is moved, by manual operation of the actuator arm, into position to receive the shutter plate;

whereby said manual operation releases the shutter plate for rotation by the spring means into the receiving portion of the escapement plate, passing the exposure orifice across the optical aperture; and wherein said shutter plate, when released into the receiving portion of the escapement plate, by virture of the mutual interference between the shutter plate and the blocking portion of the escapement plate in its cocked position, obstructs reverse operation of the escapement plate toward its cocked position; and wherein the spring means, after the shutter plate is received in the receiving portion of the escapement plate, bias the shutter plate to remain in the receiving portion of the escapement plate and to continue obstructing reverse operation of the escapement plate.

* * * * *